Patented Apr. 6, 1937

2,075,825

UNITED STATES PATENT OFFICE 2,075,825

CYCLIC PROCESS OF PRODUCING AMINES OF SATURATED HYDROCARBONS

Morris S. Nafash, Union City, N. J., assignor to Cesare Barbieri, New York, N. Y.

No Drawing. Application November 1, 1933, Serial No. 696,151

9 Claims. (Cl. 260—127)

The present invention relates to a process of producing amines, and more particularly, to a cyclic process of producing amines.

It is an object of the present invention to provide a process of producing amines which can be carried into practice with the use of alcohol as one of the raw materials.

It is another object of the invention to provide a process of producing amines which can be conducted on a cyclic basis with the recovery and re-use of the halide salt produced in the decomposition of the amine hydrohalide.

It is a further object of the invention to provide a process of producing amines which is practical and satisfactory and which is capable of being conducted on an industrial scale with relatively simple apparatus and equipment.

Other objects and advantages of the present invention will become apparent from the following description of a preferred procedure of carrying it into practice.

An aryl or alkyl halide is reacted with ammonia under the influence of heat and pressure to form an amine hydrohalide. In practice it has been found to be preferable to use a bromide. For instance, in a particular case, ethyl bromide was used in the production of ethyl amine.

In reacting a halide with ammonia, it is preferred to bring the halide and ammonia together in the vapor phase. Thus, a pool of ammonia liquor is established in a vessel which can be heated and which preferably is provided with a jacket for steam. By heating ammonia liquor of say about 19% strength to a temperature of about 160° C. the space in the reaction vessel above the pool is filled with ammonia vapor. When the halide such as ethyl halide is introduced into the heated reaction space, it is converted into a vapor. Of course, the halide could be vaporized and/or pre-heated outside of the reaction vessel and then introduced as a vapor. The vapors react under heat, say at a temperature of about 180° C., and form an amine hydrohalide, such as ethyl amine hydrobromide, which is a solid.

After the formation of the solid amine hydrohalide, the particles thereof fall into the pool of ammonia liquor. When a sufficient amount of product has collected in said liquor, the mass of ammonia liquor and suspended particles is withdrawn from the vessel as a slush.

For the purpose of freeing the amine, the solid hydrohalide is caused to react with caustic soda. For instance, in the case of ethyl amine hydrobromide, it is reacted with sodium hydroxide to form ethyl amine and sodium bromide. The sodium bromide dissolves to form a solution and then precipitates as a solid on concentration. In the event that any other halide, such as a chloride, is used, it is recovered in the same manner as the bromide. The liberated amine may be isolated by subjecting the liquor to distillation and by condensing the evolved vapor. The residual liquor remaining after distillation carries the halides, impurities and the like.

In regard to the residual liquor, it is to be noted that sodium bromide or other halides could not be recovered and used in the customary methods due to the presence of impurities and organic substances. Attempts to isolate and separate crystals of sodium bromide of commercial purity proved to be too expensive and impractical. I have discovered that the halogen of the sodium bromide can be made available for re-use by adding to the residual liquor an alcohol, such as ethyl alcohol, and a mineral acid such as sulfuric acid. An alkyl or aryl halide, such as ethyl bromide, will be formed which can be isolated by distillation, if desired, and which can be re-cycled and re-used to form an amine hydrohalide with ammonia in the reaction vessel. The formation of ethyl bromide is preferably conducted in the cold, say at temperatures of about 0° C. to about 4° C.

The equations involved in the foregoing reactions are as follows:—

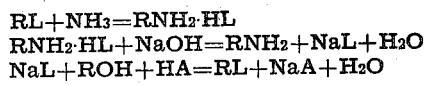

where "L" denotes a halide, "R" denotes an organic radical, and "A" denotes an acid radical.

In the event that ethyl bromide, and sulfuric acid were used the equations are as follows:—

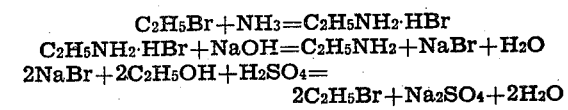

While the invention has been described herein with respect to ethyl alcohol, ethyl bromide, sodium bromide, etc., it is to be observed that the halides of other saturated hydrocarbons, such as isopropyl, propyl, butyl, amyl bromide or bromchloride, and their respective alcohols may likewise be employed in the production of corresponding amines.

I claim:

1. The cyclic process of producing amines which comprises reacting an alkyl bromide with ammonia to form a solid primary alkyl amine hydrobromide, removing solid primary alkyl amine hydrobromide, treating said solid amine hydrobromide with caustic soda in solution to free the amine and to form bromide of sodium, distilling amine from the solution containing bromide of sodium, bringing said solution into reaction contact with an alkyl alcohol containing the same alkyl radicle as in the alkyl bromide used in the first step thereof and a non-oxidizing mineral acid to form an alkyl bromide, and recovering and recycling said alkyl halide to the first step for re-use in the formation of further amounts of solid amine hydrobromide.

2. The cyclic process of producing amines which comprises reacting a propyl bromide with ammonia to form a solid propyl amine hydrobromide, treating said solid propyl amine hydrobromide with caustic soda in solution to free the amine and to form bromide of sodium distilling propyl amine from the solution containing bromide of sodium, bringing said solution into reaction contact with a propyl alcohol and a non-oxidizing mineral acid to form a propyl bromide, and recovering and recycling said propyl bromide to the first step for re-use in the formation of further amounts of solid propyl amine hydrobromide.

3. The cyclic process of producing amines which comprises reacting a butyl bromide with ammonia to form a solid butyl amine hydrobromide, treating said solid butyl amine hydro-bromide with caustic soda in solution to free the amine and to form bromide of sodium, distilling butyl amine from the solution containing bromide of sodium, bringing said solution into reaction contact with butyl alcohol and a non-oxidizing mineral acid to form a butyl bromide, and recovering and recycling said butyl bromide to the first step for re-use in the formation of further amounts of solid butyl amine hydrobromide.

4. The cyclic process of producing amines which comprises reacting ethyl bromide with ammonia to form solid ethyl amine hydrobromide, treating said solid ethyl amine hydrobromide with caustic soda in solution to free the amine and to form a sodium bromide, distilling ethyl amine from the solution contact with ethyl alcohol and a non-oxidizing mineral acid to form ethyl bromide, and recovering and recycling said ethyl bromide to the first step for re-use in the formation of further amounts of solid ethyl amine hydrobromide.

5. The cyclic process of producing amines which comprises reacting isopropyl bromide with ammonia to form solid isopropyl amine hydrobromide, treating said solid isopropyl amine hydrobromide with caustic soda in solution to free the amine and to form sodium bromide, distilling isopropyl amine from the solution containing the sodium bromide, bringing said solution into reaction contact with isopropyl alcohol and a non-oxidizing mineral acid to form isopropyl bromide, and recovering and recycling said isopropyl bromide to the first step for reuse in the formation of further amounts of solid isopropyl amine hydrobromide.

6. The cyclic process of producing amines which comprises reacting normal butyl bromide with ammonia to form solid normal butyl amine hydrobromide, treating said solid normal butyl amine hydrobromide with caustic soda in solution to free the amine and to form sodium bromide, distilling normal butyl amine from the solution containing the bromide, bringing said solution into reaction contact with normal butyl alcohol and a non-oxidizing mineral acid to form normal butyl bromide, and recovering and recycling said butyl bromide to the first step for re-use in the formation of further amounts of solid normal butyl amine hydrobromide.

7. The cyclic process of producing amines which comprises reacting an alkyl bromide with ammonia to form a solid primary alkyl amine hydrobromide, maintaining a temperature of about 160° C., treating said solid amine hydrobromide with caustic soda in solution to free the amine and to form bromide of sodium, distilling amine from the solution containing bromide of sodium, bringing said solution into reaction contact with an alkyl alcohol containing the same alkyl radicle as in the alkyl bromide used in the first step thereof and a non-oxidizing mineral acid to form an alkyl bromide, and recovering and recyling said alkyl halide to the first step for re-use in the formation of further amounts of solid amine hydrobromide.

8. The cyclic process of producing amines which comprises reacting an alkyl bromide with ammonia to form a solid primary alkyl amine hydrobromide, treating said solid amine hydrobromide with caustic soda in solution to free the amine and to form bromide of sodium, distilling amine from the solution containing bromide of sodium, bringing said solution into reaction contact with an alkyl alcohol containing the same alkyl radicle as in the alkyl bromide used in the first step hereof and sulfuric acid to form an alkyl bromide, and recovering and recycling said alkyl halide to the first step for re-use in the formation of further amounts of solid amine hydrobromide.

9. The cyclic process of producing amines which comprises reacting an alkyl bromide with ammonia to form a solid primary alkyl amine hydrobromide, treating said solid amine hydrobromide with caustic soda in solution to free the amine and to form bromide of sodium, distilling amine from the solution containing bromide of sodium, bringing said solution into reaction contact at about 0° C. to about 4° C. with an alcohol containing the same alkyl radicle as in the alkyl bromide used in the first step thereof and a non-oxidizing mineral acid to form an alkyl bromide, and recovering and recycling said alkyl halide to the first step for re-use in the formation of further amounts of solid amine hydrobromide.

MORRIS S. NAFASH.